US006109772A

United States Patent [19]

Futami et al.

[11] Patent Number: 6,109,772

[45] Date of Patent: Aug. 29, 2000

[54] LAMP WITH PETALINE REFLECTOR AND ASPHERIC LENSES

[75] Inventors: Takashi Futami; Teruo Koike; Yoshifumi Kawaguchi, all of Tokyo, Japan

[73] Assignee: Stanley Electric Co., Ltd., Tokyo, Japan

[21] Appl. No.: 09/289,564

[22] Filed: Apr. 9, 1999

[30] Foreign Application Priority Data

Apr. 10, 1998 [JP] Japan .................................. 10-099186

[51] Int. Cl.[7] .......................................... B60Q 1/02

[52] U.S. Cl. .......................... 362/517; 362/518; 362/516; 362/328; 362/336; 362/332; 362/329; 362/309

[58] Field of Search .................................... 362/487, 507, 362/518, 516, 538, 539, 341, 346, 360, 521, 522, 326, 327, 328, 329, 335, 336, 309, 343, 332

[56] References Cited

U.S. PATENT DOCUMENTS 1,814,326 7/1931 Melton .................................... 362/302
4,953,063 8/1990 Nino .................................... 362/539
6,007,223 12/1999 Futami .................................... 362/517

*Primary Examiner*—Sandra O'Shea
*Assistant Examiner*—Ismael Negron
*Attorney, Agent, or Firm*—Ostrolenk, Faber, Gerb & Soffen, LLP

[57] ABSTRACT

A lamp including a light source, a petaline reflector, and aspheric lenses. The petaline reflector is formed of a plurality of reflecting surface units combined radially around the center axis of the light source. Each of the reflecting surface units is obtained by cutting, radially around the center axis, a portion from a spheroid having a first focal point located on the center axis and adjacent the light source and a second focal point located on a line passing through the first focal point and tilted appropriately from the center axis such that the cut portion spans a range of 15° to 60° around the center axis. The aspheric lenses are disposed to correspond to the respective second focal points of the reflecting surface units of the petaline reflector and converge reflected light beams from the respective reflecting surface units. Shades for forming a light distribution pattern are disposed at the respective near-focal points of the aspheric lenses.

14 Claims, 4 Drawing Sheets

LAMP WITH PETALINE REFLECTOR AND ASPHERIC LENSES

BACKGROUND OF THE INVENTION

1. Field of the Invention

The present invention relates to a lamp and, more particularly, to a lamp suitable for use as an illumination lamp for a vehicle such as a head lamp or fog lamp, a signal lamp for a vehicle such as a tail lamp or turn signal lamp, a signal lamp for road traffic, or a signal lamp for railway traffic.

2. Background Art

FIGS. 1 to 3 show conventional lamps of this type. A lamp 90 shown in FIG. 1 basically includes: a light source 91; a revolutional paraboloidal reflector 92 having the light source 91 disposed at a focal point thereof; and a lens 93 with a lens cut 93*a*. A light beam from the light source 91 is reflected by the revolutional paraboloidal reflector 92 to form a parallel light beam. The reflected light beam is diffused properly by the lens cut 93*a* of the lens 93 to provide a desired light distribution property.

A lamp 80 shown in FIG. 2 includes a light source 81; a reflector composed of a composite reflecting surface 82; and a lens 83. The composite reflecting surface 82 has a plurality of cylindrical parabolic reflecting surfaces that are arranged to have a parabolic configuration in a vertical cross section taken when the lamp 80 is in a mounted state and have a linear configuration in a horizontal cross section (the state shown in the drawing). The lens 83 has no lens cut so that it is see-through. In the lamp 80, the composite reflecting surface 82 provides the light distribution property by itself.

A lamp 70 shown in FIG. 3 includes: a light source 71; a reflector composed of an elliptic reflecting surface 72 having the light source 71 disposed at a first focal point thereof; an aspheric lens 73; and a shade 74 provided if necessary. The elliptic reflecting surface is composed of a spheroid, a composite elliptic surface, or an elliptic free-form surface. In the arrangement, the aspheric lens 73 projects, under magnification, a light source image formed by converging a light beam at a second focal point to provide an irradiating light beam. The lamp 70 of the type using the elliptic reflecting surface 72 is termed a projector type lamp. The light distribution property is obtained by covering an unwanted portion with the shade 74.

In the lamp 90 shown in FIG. 1, however, the lens cut 93*a* should be formed to have high optical intensity, so that a significant variation is produced in the thickness of the lens 93. This degrades the transparency of the lens and makes it impossible to provide an appearance with enhanced clarity and sense of depth, which is currently preferred on the market.

It is possible to impart an appearance with enhanced clarity to the lamp 80 shown in FIG. 2, since the lens 83 without a lens cut is see-through. However, since the composite reflecting surface 82 positioned at a recessed portion forms a light distribution property, the formation of the light distribution property is limited by such a factor as difficulty in determining the light distribution property in the direction of width.

The lamp 70 shown in FIG. 3 is difficult to mount because of its increased depth dimension. Moreover, the aspheric lens 73 having a small outer diameter leads to a reduced light-emitting area. Therefore, the lamp 70 used as a headlight is inferior in visibility when viewed from an oncoming vehicle.

Each of the conventional lamps 70, 80, and 90 with the aforesaid structures is generally in wide use. Hence, it is impossible to distinguish them from other items and achieve novelty in terms of design. Furthermore, since the coefficient of use of a luminous flux from the light source is dependent on the depth dimension, the coefficient of use is lowered if the lamp is reduced in thickness.

SUMMARY OF THE INVENTION

It is therefore an object of the present invention to provide a lamp with a novel design including a plurality of aspheric lenses.

Another object of the present invention is to provide a lamp having a light distribution property free from constraints and exhibiting enhanced flexibility for a light distribution property, particularly in the horizontal direction.

Still another object of the present invention is to provide a lamp having a desired light-emitting area and improved visibility when viewed from an oncoming vehicle.

Yet another object of the present invention is to provide a lamp wherein the coefficient of use of a luminous flux from the light source is unaffected by the depth dimension.

One aspect of the present invention is to provide a lamp comprising: a light source; a petaline reflector composed of a plurality of reflecting surface units combined radially around a center axis of the light source, each of the reflecting surface units being obtained by cutting, radially around the center axis, a portion from a spheroid having a first focal point located on the center axis and adjacent the light source and a second focal point located on a line passing through the first focal point and tilted appropriately from the center axis such that the cut portion spans a range of 15° to 60° around the center axis; and aspheric lenses corresponding to the respective second focal points of the reflecting surface units of the petaline reflector and converging reflected light beams from the respective reflecting surface units.

Since the reflecting surface units are formed of elliptic reflecting surfaces which are opened outwardly, the petaline reflector, which is a combination thereof, has a reduced depth dimension so that the whole lamp is reduced in thickness and has improved mountability. Moreover, the amount of heat received by each of the aspheric lenses can be reduced by distributing light from the single light source to the plurality of aspheric lenses. As a result, it becomes possible to compose the lenses of a resin and achieve an excellent cost reducing effect.

At this time, shades for forming a light distribution pattern are preferably disposed at respective near-focal points of the aspheric lenses.

Alternatively, a central reflector obtained by cutting a portion from a spheroid having a first focal point adjacent the light source for causing the center axis to coincide with a long axis thereof and an aspheric lens located to correspond to a second focal point of the central reflector are preferably disposed on the center axis.

With the provision of the central reflector, the majority of light from the light source can be used as effective irradiating light. This increases the coefficient of use of a luminous flux from the light source and effectively improves the performance of the lamp, thereby providing a brighter lamp. Since the plurality of aspheric lenses have enlarged the light-emitting area, visibility from the viewpoint of the oncoming vehicle is also improved.

Alternatively, a shade for forming a light distribution pattern is preferably disposed at a near-focal point of the aspheric lens disposed to correspond to the central reflector.

Another aspect of the present invention is to provide a lamp comprising: a light source; a petaline reflector composed of a plurality of reflecting surface units combined radially around a center axis of the light source, each of the reflecting surface units being obtained by cutting, radially around the center axis, a portion from an elliptic free-form surface having a first focal point located on the center axis and adjacent the light source and a second focal point which is linear in a direction horizontal to the lamp in a mounted state and located on a line passing through the first focal point and tilted appropriately from the center axis such that the cut portion spans a range of 15° to 60° around the center axis; and aspheric lenses corresponding to the respective second focal points of the reflecting surface units of the petaline reflector and converging reflected light beams from the respective reflecting surface units.

At this time, a shade for forming a light distribution pattern is preferably disposed at a near-focal point of the aspheric lens, the shade for forming a light distribution pattern preferably having a configuration corresponding to the position of the second focal point which is linear in the horizontal direction such that the both end portions of the shade are curved horizontally symmetrically relative to the near-focal point of the aspheric lens toward the aspheric lens.

Alternatively, a central reflector configured as an elliptic free-form surface for causing the center axis to coincide with a long axis, locating a first focal point adjacent the light source, and forming a second focal point which is linear in a direction horizontal to the lamp in a mounted state and an aspheric lens located to correspond to the second focal point of the central reflector are preferably disposed on the center axis.

Further, a shade for forming a light distribution pattern is preferably disposed at a near-focal point of the aspheric lens disposed to correspond to the central reflector, the shade for forming a light distribution pattern preferably having a configuration corresponding to the second focal point changing in position in the horizontal direction such that the both end portion of the shade are curved horizontally symmetrically relative to the near-focal point of the aspheric lens toward the aspheric lens.

Preferably, all the aspheric lenses are formed integrally with a lens holder portion and the lens holder portion is formed transparent or opaque.

By providing the lens holder portion and forming all the aspheric lenses integrally therewith, if the lens holder portion is transparent, it becomes possible to mix an image from the lens holder portion through which the inner surface of the lamp is viewed as it is with an image from the aspheric lenses through which the inner surface of the lamp is viewed under magnification, thereby providing a novel appearance.

Alternatively, each of the aspheric lenses is preferably composed of any one selected from a convex lens, a Fresnel lens, and a combination thereof.

If the aspheric lens is formed in a Fresnel configuration, an appearance like crystal glass can be obtained. Thus, the present invention offers wider design variations to a lamp and achieves an excellent effect in improving the marketability of the lamp.

At this time, each of the aspheric lenses may have a configuration partly combined with a cylindrical lens.

At least one of the surfaces of the shade for forming a light distribution pattern viewed through the aspheric lens and the lens holder portion may be in a color other than the color of the aspheric lens.

If the lens holder portion is formed opaque and/or colored and the shade is also colored, it becomes possible to implement a lamp presenting different colors in the ON state and in the OFF state, respectively.

Alternatively, the light source may be provided with a filter in the form of a cap composed of a diffusion filter or a color filter.

DETAILED DESCRIPTION OF THE PREFERRED EMBODIMENTS

Figure 4:
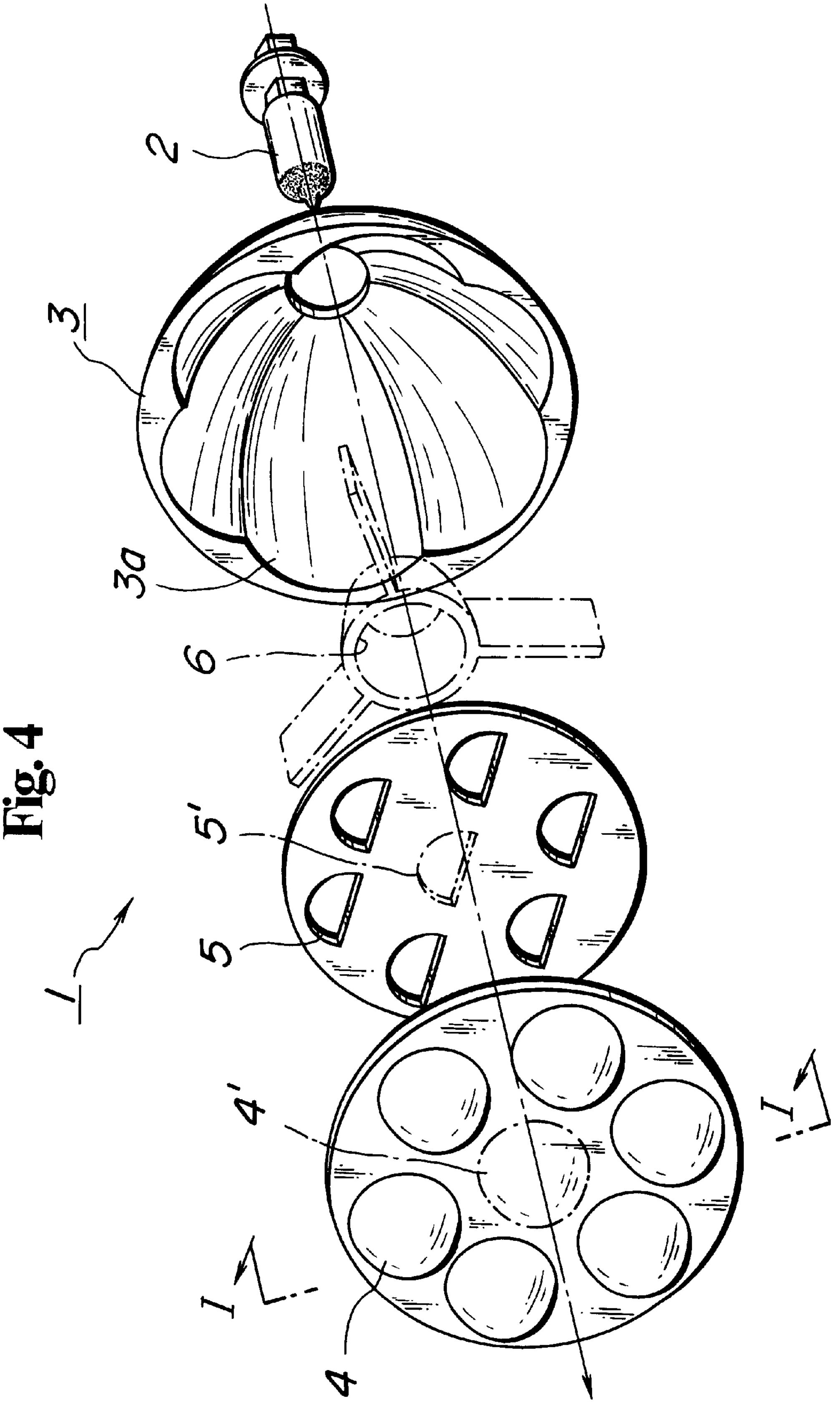
FIG. 4 is a perspective view showing a lamp according to a first embodiment of the present invention in an exploded state.
Figure 5:
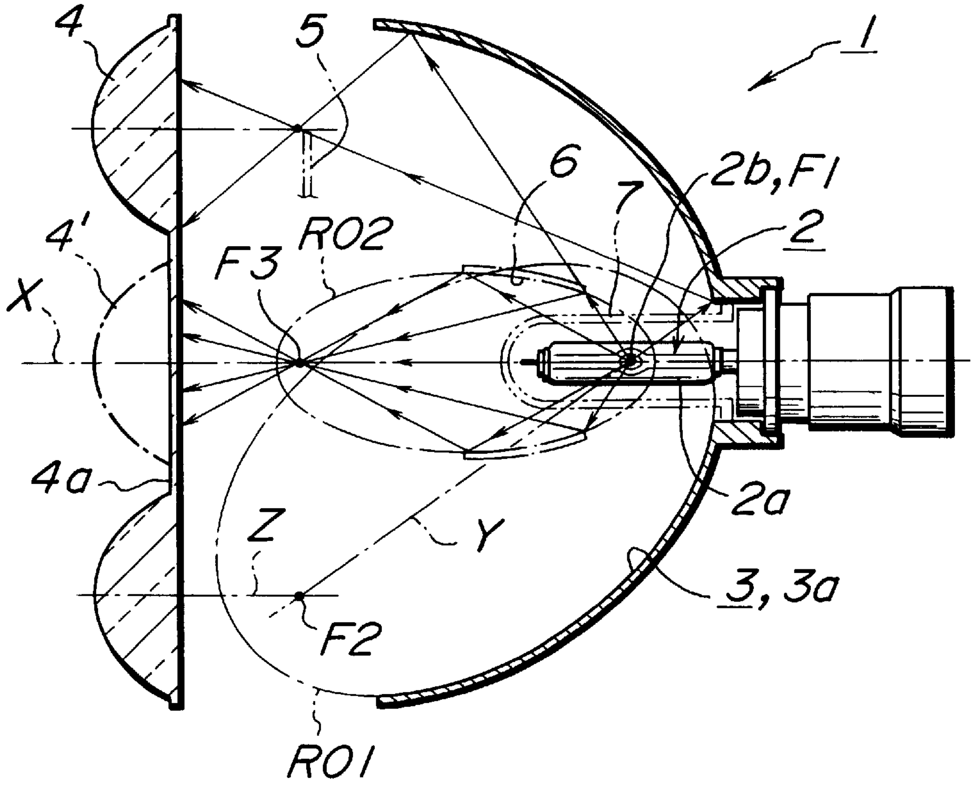
FIG. 5 is a cross-sectional view taken along the line I—I of FIG. 4.
Figure 6:
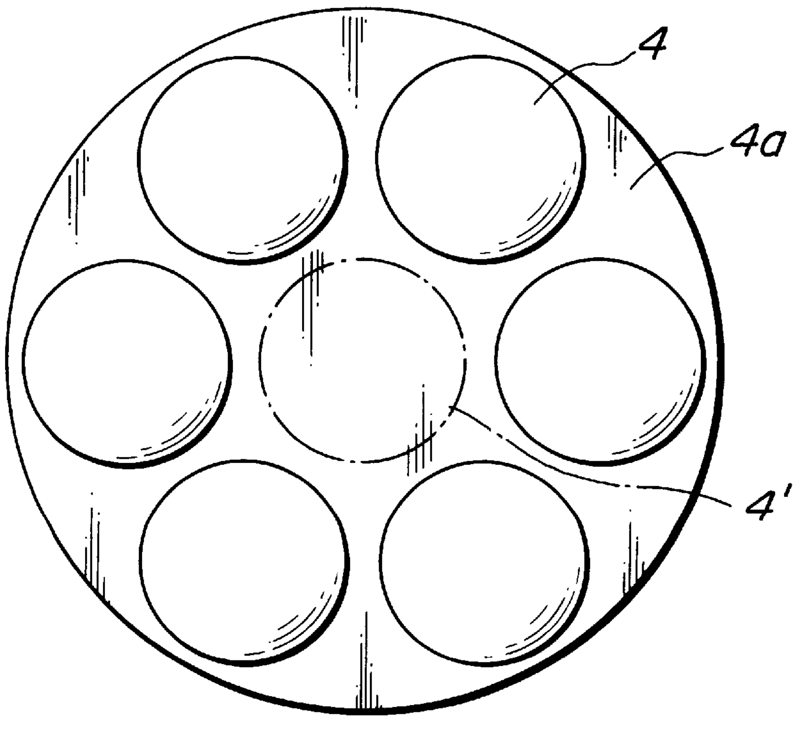
FIG. 6 is a front view of a lamp according to the present invention.

The present invention will now be described in detail with reference to the drawings that illustrate the embodiments thereof. In FIGS. 4 to 6, a reference numeral 1 denotes a lamp according to the first embodiment of the present invention. The lamp 1 comprises a light source 2; a petaline reflector 3; and aspheric lenses 4. In this case, the petaline reflector 3 is formed of a combination of plural reflecting surface units 3a (six reflecting surface units 3a are provided in the first embodiment). The number of the aspheric lenses 4 is commensurate with the number of the reflecting surface units 3a.

When the lamp 1 is used as, e.g., a headlamp for a vehicle, shades 5 for forming a light distribution pattern corresponding to the individual reflecting surface units 3a are provided. To further improve the coefficient of use of a luminous flux from the light source 2 or meet design requirements, a central reflector 6 is further provided along with an aspheric lens 4' and a shade 5' for forming a light distribution pattern, each corresponding to the central reflector 6 (see FIGS. 4 and 5).

As the light source 2, the present invention uses a light source having a single light-emitting source 2b in a bulb 2a. Specific examples of the light source 2 include an incandescence lamp with a single filament, a halogen lamp, and a metal halide lamp.

As described above, the petaline reflector 3 is a combination of the plural reflecting surface units 3a. The reflecting surface units 3*a* are arranged relative to the center axis X of the bulb 2*a* (hereinafter referred to as a bulb center axis X) as the center axis of the light source 2.

A description will be given to a method of obtaining a spheroid RO1 for the reflecting surface unit 3*a*. The light-emitting source 2*b* is present on the bulb center axis X and a first focal point F1 is set at the light-emitting source 2*b*. Then, an oblique line Y passing through the first focal point F1 and tilted appropriately from the bulb center axis X is assumed. Next, a second focal point is set on the oblique line Y and an appropriate ellipse having focal points at the first and second focal points F1 and F2 is assumed. The spheroid RO1 is obtained by rotating the ellipse around the oblique line Y as an axis. As a result, the spheroid RO1 obtained has a long axis coincident with the oblique line Y.

Each of the reflecting surface units 3*a* is obtained by cutting, from the spheroid RO1, a portion having a vertex at the point of intersection of the spheroid RO1 and the bulb center axis X and spanning a range of 15° to 60° around the bulb center axis X such that the cut portion is bilaterally symmetrical with respect to the oblique line Y (long axis). In cutting the portion, the inner side of the spheroid RO1 is used as the reflecting surface. The first embodiment has adopted the spheroid RO1 that has been cut at the position at which the reflecting surface appears when viewed from the front side of the lamp 1. The plurality of reflecting surface units 3*a* thus obtained are combined with each other to form the petaline reflector 3. In the present invention, four to ten reflecting surface units 3*a* are preferably combined.

Figure 1:
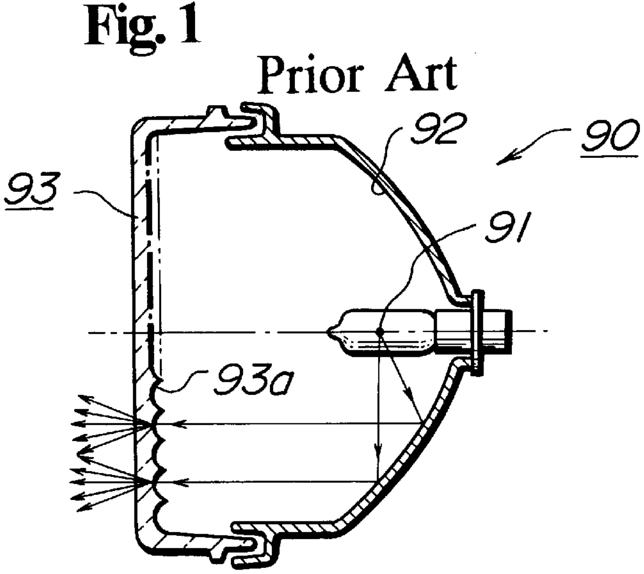
Fig. 1 Prior Art
FIG. 1 is a cross-sectional view showing a conventional embodiment.
Figure 2:
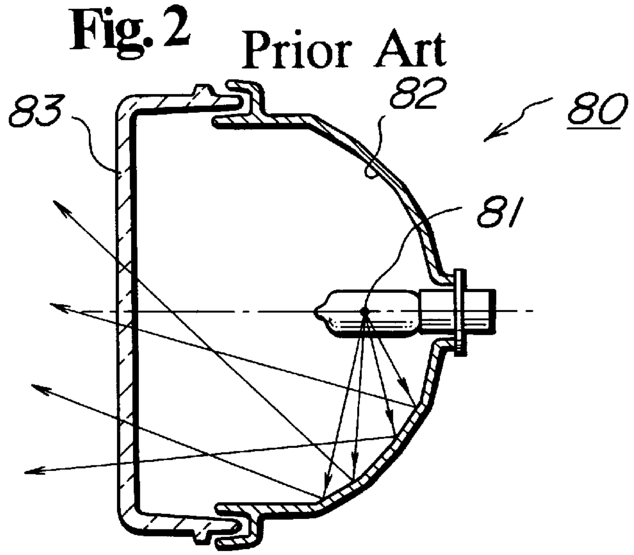
Fig. 2 Prior Art
FIG. 2 is a cross-sectional view showing another conventional embodiment.
Figure 3:
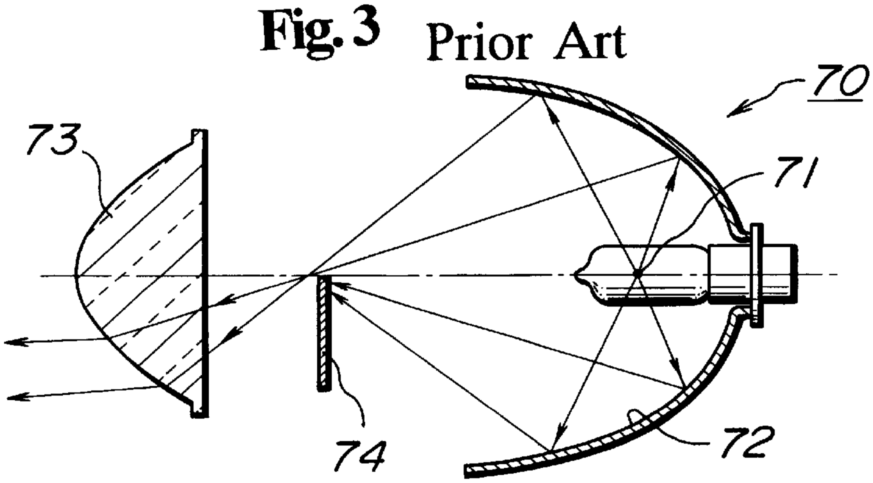
Fig. 3 Prior Art
FIG. 3 is a cross-sectional view showing still another conventional embodiment.

To correspond to the respective second focal points F2 of the reflecting surface units 3*a*, the aspheric lenses 4 having respective focal lengths of 10 to 60 mm are disposed such that the optical axes Z of the aspheric lenses 4 are nearly parallel to the bulb center axis X. The positional relationship between the second focal points F2 and the aspheric lenses 4 may be established in the same manner as established in the conventional projector type lamp shown in FIG. 3.

The lamp 1 thus structured has a generally circular light distribution property. If the lamp 1 is used as a headlight for a vehicle to emit a lowbeam, for example, it is required to provide a light distribution property suitable for the low beam. To attain the object, the present invention may dispose the shades 5 for forming a light distribution pattern at the respective near-focal points of the aspheric lenses 4. The shades 5 for forming a light distribution pattern maybe composed of any shades provided that they have the same shielding effect as achieved by the shades of the conventional embodiment shown in FIG. 3.

To improve the coefficient of light use, there may be provided the central reflector 6 formed from a spheroid, which is for causing the bulb center axis X to coincide with the long axis, as indicated by the dash-dot lines and curves in FIGS. 4 and 5. The first focal point F1 of the central reflector 6 is positioned at the light-emitting source 2*b*, similarly to each of the reflecting surface units 3*a*. On the other hand, a second focal point F3 is set on the bulb center axis X to obtain a spheroid RO2. The central reflector 6 is formed by removing an unwanted portion from the spheroid RO2.

To correspond to the second focal point F3, the aspheric lens 4' is disposed by the same means as used in the case of the reflecting surface units 3*a*. If required, the shade 5' for forming a light distribution pattern may also be disposed by the same means as used in the case of the reflecting surface units 3*a*. As a result, the aspheric lens 4' corresponding to the central reflector 6 is present at the center position surrounded by the aspheric lenses 4 corresponding to the respective reflecting surface units 3*a* arranged radially, as indicated by the dash-dot curve in FIG. 6.

A description will be given to the mounting of the aspheric lenses 4 and 4' in the present invention. Since each of the reflecting surface units 3*a* is formed under the same conditions, the aspheric lenses 4 corresponding to the respective reflecting surface units 3*a* are present on the same plane which is equidistant from and orthogonal to the bulb center axis X. If the plane orthogonal to the bulb center axis X is formed as a lens holder portion 4*a*, therefore, all the aspheric lenses 4 corresponding to the respective reflecting surface units 3*a* can be formed into one body.

At this time, only the aspheric lens 4' corresponding to the central reflector 6 may change its position either forward or backward on the bulb center axis X depending on the form of the central reflector 6. However, the aspheric lens 4' can be positioned on the plane of the lens holder portion 4*a* by properly positioning the second focal point F3 of the central reflector 6 or adjusting the focal length of the aspheric lens 4' corresponding to the central reflector 6. In short, all the aspheric lenses 4 and 4' can be formed into one body.

Although the aspheric lenses 4 and 4' are naturally formed of a transparent material, the lens holder portion 4*a* has no immediate involvement in the formation of the light distribution property or the like. In the case of forming all the aspheric lenses 4 and 4' into one body, therefore, the lens holder portion 4*a* may also be formed of the same material as forming the aspheric lenses 4 and 4'. Alternatively, the lens holder portion 4*a* may be formed in a different color or opaque by a method of two color molding or the like. It is to be noted that the shades 5 and 5' for forming a light distribution pattern may also be formed into one body by a similar method (see FIG. 4).

If the aspheric lenses 4 and 4' are formed integrally with the lens holder portion 4*a* and the color imparted to the frame of the vehicle is also imparted to the lens holder portion 4*a* and to the sides of the shades 5 and 5' which are closer to the aspheric lenses 4, the color of the lens holder portion 4*a* is recognized during the daytime, while the color imparted to the shades 5 and 5' for forming a distribution pattern can be viewed through the aspheric lenses 4 and 4'. This enables the entire lamp 1 to be viewed from every direction in the same color as the car frame and increases design flexibility.

In FIG. 5, a reference numeral 7 denotes a filter. The filter 7 is in the form of a cap covering the light source 2. The filter 7 is formed to have the function of diffusing or coloring a light beam emitted from the light source 2 and reaching the petaline reflector 3 and the central reflector 6.

In a typical lamp composed of an elliptic reflecting surface and an aspheric lens, irradiating light is generally formed into spotlight. Accordingly, a contrast difference between an illuminated place and an unilluminated place tends to be significant. In this case, if a filter having a frosted surface or the like and proper diffusiveness is used as the filter 7, the light beam from the light source 2 is properly diffused on passing through the filter 7, so that the significant contrast difference is alleviated. It is also possible to use the lamp 1 as a fog lamp or a traffic signal lamp in the color of red, blue, yellow, or the like by imparting an appropriate color such as amber to the filter 7 instead of imparting diffusiveness thereto.

Figure 7:
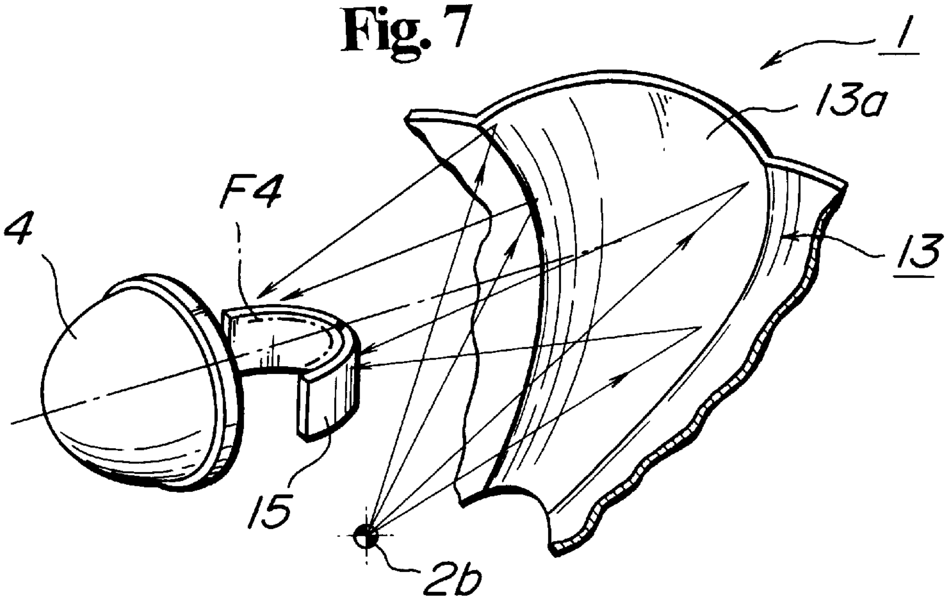
FIG. 7 is a perspective view showing a principal portion of a lamp according to a second embodiment of the present invention.

FIG. 7 shows a principal portion of the second embodiment of the present invention. In the first embodiment described above, the reflecting surface unit 3*a* composing the petaline reflector 3 is configured as a spheroid. In the case of using the lamp as a headlamp, however, an illuminating light beam provided in the horizontal direction by the spheroidal reflecting surface has only an insufficient width.

The second embodiment has been implemented in view of the foregoing and the reflecting surface unit 13*a* is configured as an elliptic free-form surface (composite elliptic surface) such that a second focal point F4 linearly expands in the horizontal direction. Since means for forming the reflecting surface from the elliptical free-form surface has widely been used in the conventional projector type lamp (see FIG. 3), the detailed description thereof is omitted here.

A plurality of reflecting surface units 13*a* each configured as an elliptic free-form surface having such a second focal point as to linearly expand in the horizontal direction are combined with each other to form a petaline reflecting surface 13. In the lamp 1 of the second embodiment thus structured, a basic light distribution property has a generally elliptic configuration with a long axis extending in the horizontal direction, which compensates for the insufficient width of the illuminating light beam in the horizontal direction.

In the case of using the lamp 1 of the second embodiment as a low beam, a shade 15 for forming a light distribution pattern corresponding to each of the reflecting surface units 13*a* is disposed between the reflecting surface unit 13*a* and the aspheric lens 4, similarly to the first embodiment. In this case, the shade 15 for forming a light distribution pattern has both end portions curved horizontally symmetrically relative to the near focal point of the aspheric lens 4 toward the aspheric lens 4, thereby corresponding to the second focal point expanding linearly in the horizontal direction, which is produced by the reflecting surface units 13*a*. It is to be noted that means for curving the shade 15 for forming a light distribution pattern is also used in the conventional projector type lamp (see FIG. 3).

In the second embodiment also, a central reflector for causing the bulb center axis X to coincide with the long axis (not shown concretely, refer to FIGS. 3 and 4) is provided if an improved coefficient of light use is intended, similarly to the first embodiment. The central reflector is configured as an elliptic free-form surface whereby a first focal point F1 is positioned at the light-emitting source 2*b* and a second focal point, which is linear in the horizontal direction, is positioned on the bulb center axis X, similarly to each of the foregoing reflecting surface units 13*a*.

The aspheric lens 4' is disposed to correspond to the second focal point of the central reflector by the same means as used in the case of the reflecting surface units 13*a*. If necessary, the curved shade for forming a light distribution pattern is disposed by the same method used in the case of the reflecting surface units 13*a*. Since the second embodiment is similar to the first embodiment in terms of the aspheric lens 4, it is also possible to provide a lens holder portion 4*a* in the lamp according to the second embodiment and form all the aspheric lenses 4 and 4' into one body.

Figure 8:
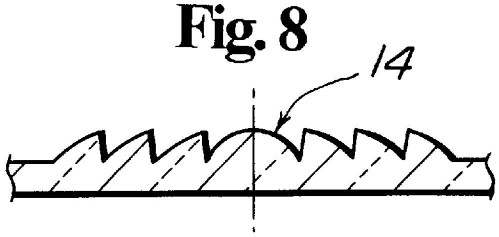
FIG. 8 is a cross-sectional view showing a principal portion of a lamp according to a third embodiment of the present invention.
Figure 9:
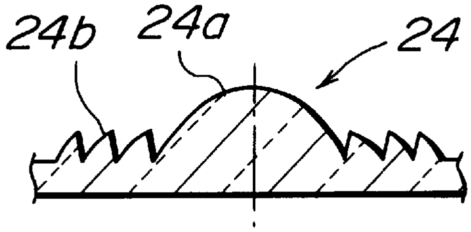
FIG. 9 is a cross-sectional view showing a principal portion of a lamp according to a fourth embodiment of the present invention.

FIGS. 8 and 9 show respective principal portions of the third and fourth embodiments of the present invention. Although the aspheric lenses 4 and 4' have been formed as convex lenses in either of the first and second embodiments described above, the present invention is not limited thereto. It is also possible to form an aspheric lens in a Fresnel configuration to provide an aspheric Fresnel lens 14, as shown in FIG. 8 illustrating the third embodiment. Alternatively, it is also possible to form a deformed aspheric lens 24 (24'), which is composed of a center portion 24*a* in the form of a convex lens and a peripheral portion 24*b* in the form of a Fresnel lens, as shown in FIG. 9 illustrating the fourth embodiment. Normally, the aspheric lens 4 has a configuration projecting conspicuously toward the viewer side. By using the lens according to the third or fourth embodiment, the forward projection becomes less conspicuous, resulting in a design variation. If the pitch for forming a lens in the Fresnel configuration is controlled properly, an appearance like crystal glass can be imparted to the lens. By forming a lens in the Fresnel configuration, the thickness of the lens becomes uniform. In the case of forming the aspheric lens portion from a resin, therefore, such deformation as sink does not occur during molding, so that optical accuracy is increased.

Figure 10:
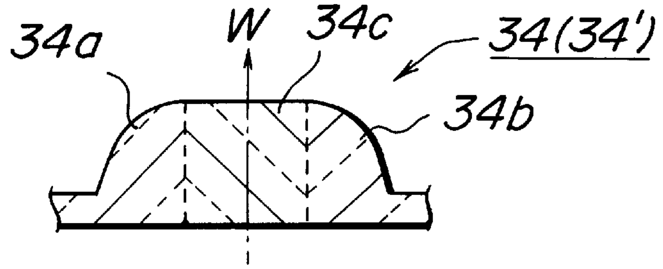
FIG. 10 is a cross-sectional view showing a principal portion of a lamp according to a fifth embodiment of the present invention.

FIG. 10 shows a principal portion of the fifth embodiment of the present invention. An aspheric lens 34 (34') in the fifth embodiment is composed of lens portions 34*a* and 34*b* and a cylindrical portion 34*c*. The lens portions 34*a* and 34*b* are configured as the halves of the aspheric lens 4 illustrated in the first embodiment, which are obtained by halving the aspheric lens 4 with the center axis.

The lens portions 34*a* and 34*b* have their respective divided surfaces connected to the both ends of the cylindrical portion 34*c*. By thus forming the aspheric lens 34, even a luminous flux having a nearly circular cross section from the reflecting surface unit 3*a* formed from the spheroid, as shown in the first embodiment, is enlarged in the direction of the axis W of the cylindrical portion 34*c* on passing through the spherical lens 34. In the case of using the lamp 1 as a headlamp or the like, therefore, the light distribution property which is wide in the horizontal direction can be obtained by disposing the lamp 1 such that the axis W extends in the horizontal direction.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A lamp comprising:

a light source;

a petaline reflector composed of a plurality of reflecting surface units combined radially around a center axis of said light source, each of said reflecting surface units being obtained by cutting, radially around said center axis, a portion from a spheroid having a first focal point located on said center axis and adjacent said light source and a second focal point located on a line passing through said first focal point and tilted appropriately from said center axis such that the cut portion spans a range of 15° to 60° around the center axis; and aspheric lenses corresponding to said respective second focal points of the reflecting surface units of said petaline reflector and converging reflected light beams from the respective reflecting surface units.

2. The lamp according to claim 1, wherein all the aspheric lenses are formed integrally with a lens holder portion and said lens holder portion is formed transparent or opaque.

3. The lamp according to claim 1, wherein each of said aspheric lenses is composed of any one selected from a convex lens, a Fresnel lens, and a combination thereof.

4. The lamp according to claim 1, wherein each of said aspheric lenses has a configuration partly combined with a cylindrical lens.

5. The lamp according to claim 1, wherein the light source is provided with a filter in the form of a cap composed of a diffusion filter or a color filter.

6. The lamp according to claim 1, wherein shades for forming a light distribution pattern are disposed at respective near-focal points of the aspheric lenses.

7. The lamp according to claim 6, wherein at least one of the surface of said shade for forming a light distribution pattern viewed through said aspheric lens and said lens holder portion is in a color other than the color of the aspheric lens.

8. The lamp according to claim 1, wherein a central reflector obtained by cutting a portion from a spheroid having a first focal point adjacent said light source for causing the center axis to coincide with a long axis and an aspheric lens located to correspond to a second focal point of the central reflector are disposed on said center axis.

9. The lamp according to claim 8, wherein a shade for forming light distribution pattern is disposed at a near-focal point of the aspheric lens disposed to correspond to said central reflector.

10. A lamp comprising:

a light source;

a petaline reflector composed of a plurality of reflecting surface units combined radially around a center axis of said light source, each of said reflecting surface units being obtained by cutting, radially around said center axis, a portion from an elliptic free-form surface having a first focal point located on said center axis and adjacent said light source and a second focal point which is linear in a direction horizontal to the lamp in a mounted state and located on a line passing through said first focal point and tilted appropriately from said center axis such that the cut portion spans a range of 15° to 60° around the center axis; and aspheric lenses corresponding to said respective second local points of the reflecting surface units of said petaline reflector and converging reflected light beams from the respective reflecting surface units.

11. The lamp according to claim 10, wherein a shade for forming a light distribution pattern is disposed at a near-focal point of said aspheric lens, said shade for forming a light distribution pattern having a configuration corresponding to the position of the second focal point which is linear in the horizontal direction such that the both end portions of the shade are curved horizontally symmetrically relative to the near-focal point of the aspheric lens toward the aspheric lens.

12. The lamp according to claim 10, wherein a central reflector configured as an elliptic free-form surface for causing the center axis to coincide with a long axis, locating a first focal point adjacent said light source, and forming a second focal point which is linear in a direction horizontal to the lamp in a mounted state and an aspheric lens located to correspond to the second focal point of the central reflector are disposed on said center axis.

13. The lamp according to claim 12, wherein a shade for forming a light distribution pattern is disposed at a near-focal point of the aspheric lens disposed to correspond to said central reflector, said shade for forming a light distribution pattern having a configuration corresponding to the second focal point changing in position in the horizontal direction such that the both end portion of the shade are curved horizontally symmetrically relative to the near-focal point of the aspheric lens toward the aspheric lens.

14. The lamp according to claim 13, wherein at least one of the surface of said shade for forming a light distribution pattern viewed through said aspheric lens and said lens holder portion is in a color other than the color of the aspheric lens.

* * * * *